United States Patent [19]

Roeseler et al.

[11] 4,213,587

[45] Jul. 22, 1980

[54] HINGE ARRANGEMENT FOR CONTROL SURFACES

[75] Inventors: William G. Roeseler, Bellevue; Gary J. Warner, Issaquah; Richard B. Odell, Kirkland, all of Wash.

[73] Assignee: The Boeing Company, Seattle, Wash.

[21] Appl. No.: 966,529

[22] Filed: Dec. 4, 1978

[51] Int. Cl.² .............................................. B64C 9/02
[52] U.S. Cl. ................................. 244/213; 16/128 R; 16/162; 16/169; 114/274; 244/215; 403/316; 244/131
[58] Field of Search ............... 244/213, 131, 214, 215, 244/219, 90 R; 160/116, 229; 16/162, 169, 128 R; 403/154, 155, 316; 49/371; 29/11; 114/274, 280, 281

[56] References Cited

U.S. PATENT DOCUMENTS

| 619,356 | 2/1899 | Shannon | 16/162 |
|---|---|---|---|
| 1,911,121 | 5/1933 | Kerr et al. | 16/128 R |
| 2,295,306 | 9/1942 | Tampier | 244/215 |
| 2,329,133 | 9/1943 | Peed, Jr. | 244/215 |
| 2,850,340 | 9/1958 | Brill | 403/154 |
| 3,140,066 | 7/1964 | Sutton et al. | 244/215 |

*Primary Examiner*—Galen L. Barefoot
*Attorney, Agent, or Firm*—Nicolaas DeVogel

[57] ABSTRACT

A hinge arrangement between a lifting foil and a flap. The flap comprises a plurality of sections. Each section is mounted by one coupling restraining hinge device to the foil, the hinge device has a hinge pin that extends into a socket located in an adjacent section so that both sections are supported by the hinge. In addition, each two sections are interconnected by a shear key protruding from one section into the same socket of the adjacent section.

7 Claims, 7 Drawing Figures

HINGE ARRANGEMENT FOR CONTROL SURFACES

BACKGROUND OF THE INVENTION

The United States Government has rights in this invention pursuant to Contract No. N00024-77-C-2051 awarded by the Department of Defense, United States Navy.

FIELD OF THE INVENTION

The present invention relates to a hinge arrangement utilized between a lifting foil and a sectionalized flap and, more particularly, to a hinge arrangement employing at least one coupling restraining hinge that supports two flap sections from one foil mounting.

DESCRIPTION OF THE PRIOR ART

In conventional hinge arrangement between a wing or lifting foil and the controlled flap surfaces, the flap is supported by two or more hinges which are mounted between the foil and the flap. In many applications, the flap surface is of a substantial length and therefore, in order to prevent binding of hinges particularly in the center portion of the flap, due to the bending loads which are experienced during flight, the conventional elongated flap structures are segmented or sectionalized into a plurality of sections. These sections are feasibly interconnected so that a universal movement of the complete flap structure can occur. However, each section is supported by at least two or more hinge assemblies. As a result, each hinge assembly experiences a number of undesirable stress concentrations at the fastener holes and each hinge assembly requires a manufacturing process which is dictated by accurate tolerance precision. Thus, it will be evident that an elimination of a number of hinges would be very economic, reduces the stress concentration points, and reduces the maintenance time.

Accordingly, the present invention is directed to a hinged arrangement between a lifting foil and a segmented or sectionalized flap wherein the usual paired hinged mountings per each flap is eliminated. Each flap section is mounted to the lifting foil by a single bearing means which has a hinge pin that extends within a socket provided therefor in the adjacent flap section for supporting the adjacent flap section. A shear key, located at a spaced location aft of the hinge pin, extends into the same socket, for accomplishing rotating function of the sections. A similar hinge arrangement is mounted to the adjacent flap and so on. In comparison to the prior art, this type of hinge arrangement eliminates every other conventional type of hinge and this arrangement has not been observed in the prior art.

SUMMARY OF THE INVENTION

The herein disclosed invention provides for a more efficient and economic designing and manufacturing of hinge arrangements for control surfaces. The specifically designed coupling restraining hinge which supports every adjacent section in a flap, for universal movement of the sections about an elongated axis, comprises basically a spherical hinge mounted on a wing or foil which connects pivotally to one section by means of a pivot pin. The pivot pin extends through the hinge into the adjacent section and is received therein by a designed socket. In addition, the sections are interconnected by a restraining or shear key forming part of the coupling restraining hinge assembly. The shear key is mounted at a predetermined distance from the hinge pin so that a most efficient leverage is obtained in order to move the sections universally.

Thus, the present invention relates to a hinge arrangement for surfaces and lifting surfaces; however, utilization of the invention is particularly important and useful in hydrofoil craft. It will be understood that the various loads in a liquid are many times higher than those experienced in a gas medium for an aircraft or the like.

In general, the presently disclosed hinge arrangement joins a first structural member, wing or foil, to a second structural member or flap control surface. The flap control surface comprises a plurality of segments or sections which are positioned adjacent to one another and are disposed next to the first structural member. The hinge arrangement provides for relative movement between the first and the second member by means of a number of hinge assemblies. The number of hinge assemblies is one more in total than the plurality of sections and are mounted between the first member and the second so that at least two hinge assemblies are carried by one particular section. The number of hinge assemblies employed includes a first general or conventional hinge assembly mounted between the first member and a first section and a second general assembly mounted between the first member and a last or end section for pivotal movement between the first member and the second member about an elongated axis. Furthermore, the number of hinge assemblies includes at least one coupling restraining hinge assembly which is mounted between the first member and one section and is interconnected between that one section and its adjacent flap section. The coupling restraining hinge assembly includes; a hinge lug portion which projects from the first member towards that one section, which has a receiving portion for receiving the lug portion. The adjacent section is provided with a slot which faces that one section. The slot is disposed substantially perpendicular to the elongated axis. In addition, there exists a shear key which projects from that one section at a predetermined spacing from the elongated axis to provide for sufficient leverage during pivoting of the second member about the elongated axis. The shear key is inserted and restrained in the slot. The bearing pin is disposed in the receiving portion and is positioned substantially coaxially with the elongated axis and extends into the slot also. Thus, a pivotal connection between the first member to that one section and a pivotal coupling with the adjacent section is accomplished while simultaneously that one section is restrained to the adjacent section by the bearing pin and the shear key inside of the slot, so that universal movement of the sections about the elongated axis can be accomplished.

DETAILED DESCRIPTION OF THE INVENTION

Figure 1:
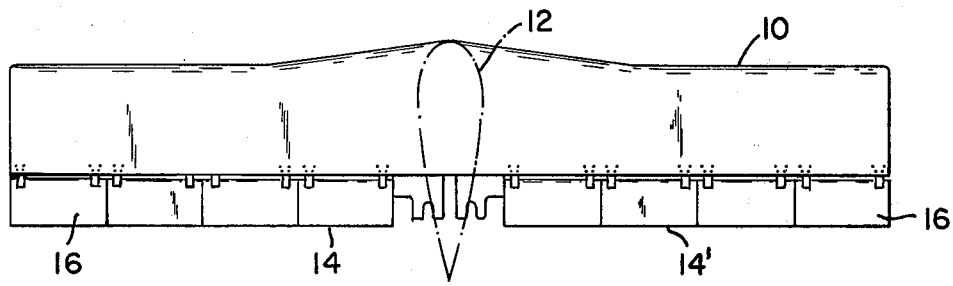
FIG. 1 is a plan view of a typical foil and flap structure used on the forward strut of a hydrofoil craft. A conventional hinging arrangement is used between the foil and the flap sections.
Figure 2:
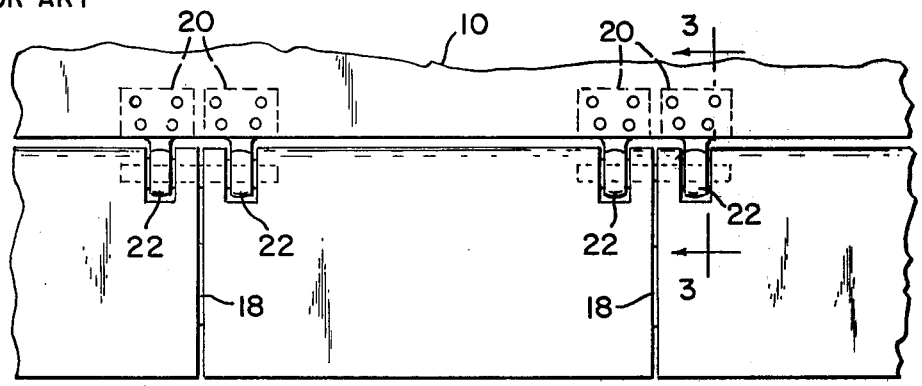
FIG. 2 is an enlarged plan view of a portion of the illustration shown in FIG. 1.
Figure 3:
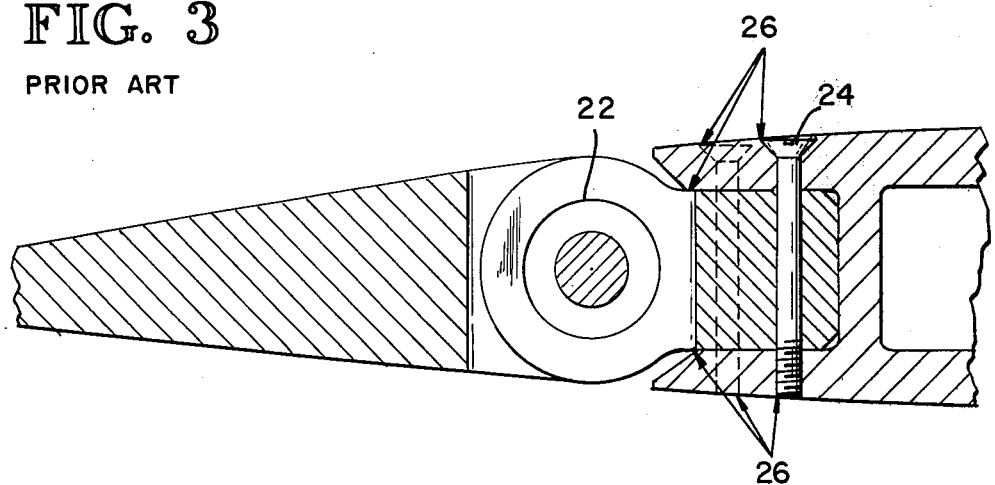
FIG. 3 is a section taken on the line 3—3 of FIG. 2.

Referring to the drawings, FIGS. 1, 2, and 3 are conventional hinge arrangements utilized on a foil/flap structure of a hydrofoil craft. As discussed above, the invention is most essential in applications where relative heavy vertical loads are experienced. Therefore, the exemplary illustration refers to a hydrofoil lifting foil and its control flap, but it should be realized that the same may also apply to other applications such as aircraft wing and flaps, etc.

As indicated, the foil 10 is supported by a forward strut 12 indicating that the illustrated assembly is utilized on a "Canard" type of hydrofoil. The "Canard" type of hydrofoil arrangement experiences one of the heaviest vertical loads on its forward foil in the hydrodynamic lifting art. Flaps 14 and 14' on port and starboard side are extending along the trailing edge of the foil 10 and are each an assembly of a number of substantial equal size sections 16. The sections 16 are interconnected by a lug or key so that the sections will move universally; however, they retain individual support about the hinge axis so that hinge binding problems are avoided. In the aircraft as well as in the hydrofoil boat construction, each section is individually hinged by at least two hinge assemblies 20 from the wing or foil 10. The hinge assemblies illustrated in FIGS. 2 and 3 are provided with conventional bearings 22 and are attached by bolts 24 to the foil 10. A number of unavoidable stress concentrations exist and the most serious ones are at various locations, as indicated by the arrows 26.

Figure 4:
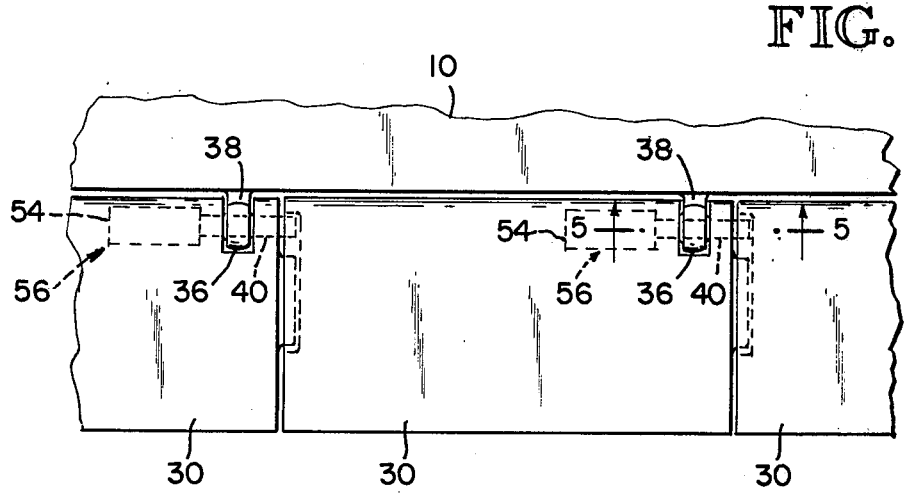
FIG. 4 is a plan view of a hinging arrangement for connecting movable control surfaces to a wing or foil as taught by the herein disclosed invention and is an enlarged portion taken from FIG. 7.
Figure 5:
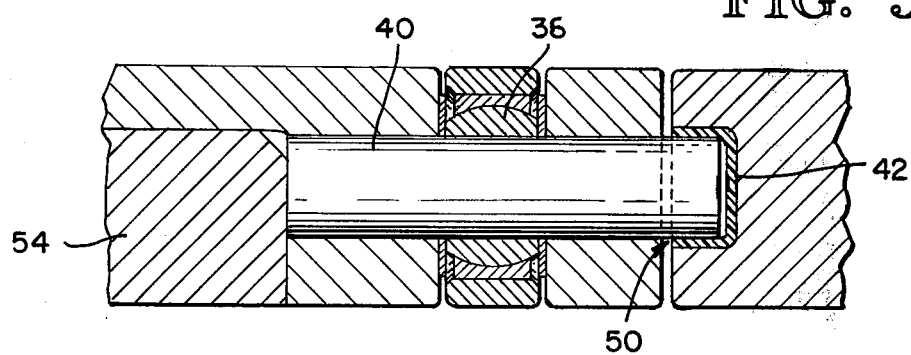
FIG. 5 is a section taken on the line 5—5 of FIG. 4.
Figure 7:
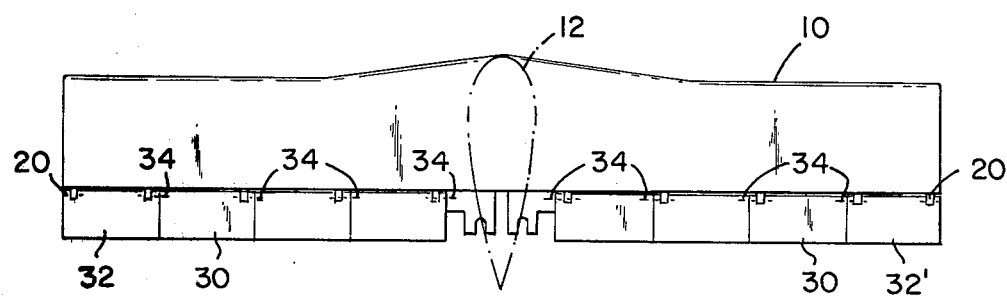
FIG. 7 is a plan view similar to FIG. 1 and illustrating in particular the lesser number of hinges required.

Referring now to the improved hinge arrangement of the herein disclosed invention, FIG. 7 illustrates that flap section 30, except for the outboard sections 32 and 32', is supported by only one coupling restraining hinge assembly 34. The general arrangement of the coupling restraining hinge assembly 34 as shown in FIGS. 4 and 5 preferably includes a single bearing 36 which is set into a single foil hinge lug 38, with a single hinge pin 40, near the corner of the secton 30. The opposite end corner of each section 30 is not supported to the foil 10, but rather, it is supported by the next adjacent section 30. The support is accomplished by the extension of the hinge pin 40 into a therefor provided socket 42. The socket 42 is preferably coated by or manufactured from a non-metallic material such as Teflon, nylon, or the like. As can be noticed in FIG. 7, when compared to FIG. 1, it appears that every other bearing or hinge arrangement as conventionally utilized in the prior art has been removed or eliminated. The advantages resulting from the present hinge arrangement are many. For instance, several extra bearings, lugs, and additional parts, bolts, stress concentrations, close manufacturing tolerances, maintenance time, and cost, etc., are eliminated and avoided. In addition, less drag is experienced by a hydrofoil or aircraft due to less hinge to flap discontinuities.

The non-metallic socket or liner 42 extends alongside the section and serves as a load path between the shear key 44 and the socket 42 where the section to section hinge moment occurs.

Figure 6:
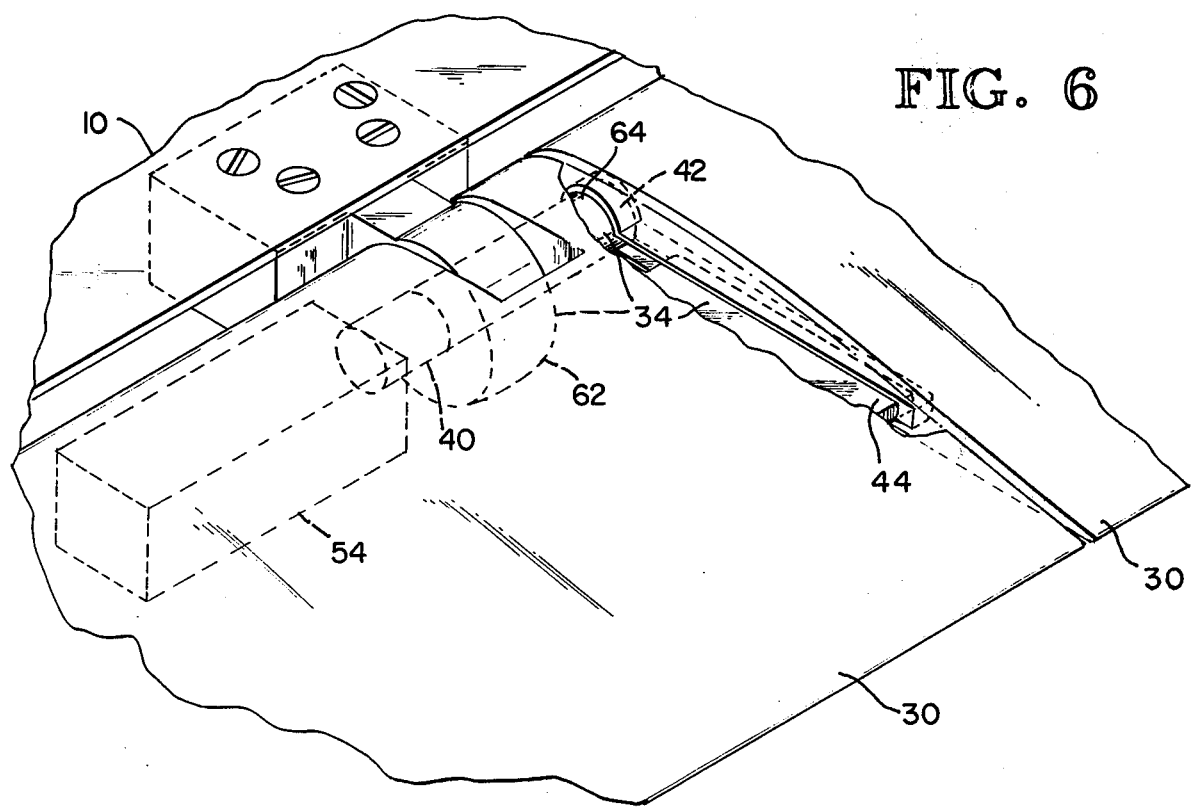
FIG. 6 is an isometric illustration of the coupling restraining hinge assembly.

FIGS. 5 and 6 illustrate in detail the various components which are essential and make up the novel arrangement of the coupling constraining hinge assembly 34. In the sectional view of FIG. 5, the section flap 30 has been provided with an opening 50 which preferably is provided with a liner 42 for interconnecting pin 40. The spherical bearing 36 is mounted in the lug 38. The liner 42 provides enough space to receive the pin 40 for accomplishing the connection to the adjacent flap section. Thus, a pivotal hinge arrangement is provided between the flap and the section and between the section and the adjacent section to provide for the coupling. Thereafter, as shown in FIGS. 4 and 6, a filler block 54 is positioned into the opening 56 which will retain the bearing pin 40 in its position and simultaneously closes the opening 56.

The coupling restraining hinge arrangement is completely illustrated in the isometric FIG. 6 thus showing the coupling and the restraining objectives. The slot 50 which is provided in the adjacent section, is located in a substantial perpendicular plane in relationship to the elongated axis of hinge rotation. The slot 50 comprises a liner material 42 illustrated to be of a non-metallic base and is adapted to receive the hinge pin 40 as well as the shear key 44 which both protrude from the one section into the adjacent section. It should be realized of course that neither the pin 40 nor the shear key 44 are mounted inside of the slot provided in the liner but are fitted within relatively close tolerances so that some sliding horizontal individual movement or flexibility between the sections can be maintained in order to handle the vertical loads acting from either above or below onto the flap control surfaces. In particular in applications such as hydrofoil foils and control flaps, these loads can be significant and tend to bend or cause misalignment between the second structural member or control flap assembly and the foil.

In summary, the coupling restraining hinge assembly 34 comprising the pin 40, the hinge means 62, and key 44, (see FIG. 6) replaces the conventional two or paired hinges and reduces cost, maintenance and wear. In the application as illustrated, very substantial savings are realized ranging between 30 to 45 percent.

It should be noted also that the elongated slot 50 provides for an easy removal of the sections by the successive removal of the hinge pins 40 which enable the operator to slide section after section aftwards and sideways clearing the shear keys. In the prior art connected section, each fastener of each hinge assembly has to be removed before the sections are disconnected.

While the above described invention has been explained in its preferred form in connection to a most useful application such as on a hydrofoil, it should be understood that the invention is also applicable on lifting foils and/or rudders on surface effect ships, submarines, aircraft, missiles, etc.

Accordingly, it should be understood that the invention may be embodied in other forms without departing from the spirit or essential characteristics thereof. The present configuration is therefore to be considered in all respects as illustrated and not restrictive, the scope of the invention being indicated by the appended claims rather than by the foregoing description and all changes which come within the meaning arranged for equivalence of the claims are therefore intended to be embraced therein. Now, therefore,

I claim:

1. A hinging arrangement for pivotally joining a first structural member to a plurality of sections positioned adjacent to one another and forming a second structural member disposed next to said first member, for relative movement between said first member and said second member about one elongated axis and for allowing relative restrained flexibility between each said adjacent sections of said second member, comprising in combination;
   - (A) a number of hinge assemblies, being one more in total than said plurality of sections, mounted between said first member and said second member so that at least two hinge assemblies are carried by a particular section of said plurality of sections,
   - (B) said number of hinge assemblies having one first general hinge assembly mounted between said first member and a first section of said plurality of sections and one second general hinge assembly mounted between said first member and a last section of said plurality of sections for pivotal movement between said first member and said second member about said elongated axis,
   - (C) said number of hinge assemblies including at least one coupling restraining hinge assembly mounted between said first member and one section and interconnected between said one section and an adjacent section of said plurality of sections,
   - (D) said coupling restraining hinge assembly including;
     - (1) a hinge lug portion projecting from said first member towards said one section,
     - (2) said one section provided with a receiving portion for receiving said lug portion,
     - (3) said adjacent section provided with a slot facing said one section and disposed substantially perpendicular to said elongated axis,
     - (4) a shear key projecting from said one section at a predetermined spacing from said elongated axis, at a location opposite of said slot, and protruding into said slot, and
     - (5) a pin disposed in said receiving portion and positioned substantially coaxially with said elongated axis and extending into said slot, for pivotally connecting said first member to said one section and pivotally coupling said adjacent section to said one section while simultaneously restraining said one section to said adjacent section by said shear key inside of said slot.

2. A hinging arrangement for pivotally joining a first structural member to a plurality of sections positioned adjacent to one another and forming a second structural member disposed next to said first member, for relative movement between said first member and said second member about one elongated axis and for allowing relative restrained flexibility between each said adjacent sections of said second member, as claimed in claim 1, wherein said coupling restraining hinge assembly lug portion is provided with a bearing means for receiving said pin.

3. A hinging arrangement for pivotally joining a first structural member to a plurality of sections positioned adjacent to one another and forming a second structural member disposed next to said first member, for relative movement between said first member and said second member about one elongated axis and for allowing relative restrained flexibility between each said adjacent sections of said second member, as claimed in claim 2, wherein said coupling restraining hinge assembly slot in said adjacent section is provided with a friction reducing liner material.

4. A hinged arrangement for pivotally joining a first structural member to a plurality of sections positioned adjacent to one another and forming a second structural member disposed next to said first member, for relative movement between said first member and said second member, as claimed in claim 3, wherein said one section provided with said lug receiving means is provided with an opening adjacent thereto and coaxially with said elongated axis for insertion of said pin into said lug receiving means and said lug and said slot and wherein means are provided to fill said opening for simultaneously locking said pin into place.

5. A coupling restraining hinge assembly for connecting a pair of adjacent flap sections to a wing while providing a restraining connection between said sections for universal pivoting about an elongated axis, comprising in combination;
   - (A) A hinged lug portion projecting from said wing toward a first flap section of said pair of flap sections,
   - (B) said first flap section provided with receiving means in compliance with said lug portion,
   - (C) said second flap section provided with a slot in its side adjacent to said first flap section and said slot being substantially disposed on a plane perpendicularly to said elongated axis,
   - (D) a shear key projecting from said first flap section opposite of said slotted side and adapted to be retained in a restrained mode therein, and
   - (E) a pin for pivotally connecting said lug into said receiving means and adapted to extend into said slot for providing coupling of said pin with said second flap section for pivotal movement about said elongated axis, whereby upon pivoting of said first flap section about said pin said second section universally pivots likewise about said pin and socket while being restrained in substantially universal pivotal movement with said first flap section by said shear key.

6. The coupling restraining hinge assembly for connecting a pair of adjacent flap sections to a wing while providing a restraining connection between said sections for universal pivoting about an elongated axis, as claimed in claim 5 wherein said slot is provided with a liner possessing lubrication material.

7. The coupling restraining hinge assembly for connecting a pair of adjacent flap sections to a wing while providing a restraining connection between said sections for universal pivoting about an elongated axis, as claimed in claim 6 wherein said first flap section is provided with an opening next to said receiving means for inserting said hinge pin for coaxial insertion into said lug and said slot and wherein a filler means is provided so that after said pin is inserted into said lug and slot said filler means is positioned and mounted into said opening for locking said pin into said lug/slot insertion.

* * * * *